United States Patent [19]

Pollard

[11] Patent Number: 5,139,055
[45] Date of Patent: Aug. 18, 1992

[54] LIQUID COOLED ELECTRIC GENERATING APPARATUS AND METHOD FOR FILLING A LIQUID CIRCULATION SYSTEM THEREIN

[75] Inventor: David D. Pollard, Amanda Township, Allen County, Ohio

[73] Assignee: Westinghouse Electric Corp., Pittsburgh, Pa.

[21] Appl. No.: 826,275

[22] Filed: Jan. 24, 1992

Related U.S. Application Data

[63] Continuation of Ser. No. 605,895, Oct. 30, 1990, abandoned.

[51] Int. Cl.$^5$ ............................................. B65B 31/00
[52] U.S. Cl. ...................................... 141/1; 141/346; 141/5; 141/46; 137/98; 222/318
[58] Field of Search ............... 141/1, 4, 5, 46, 98, 141/82, 346–349, 352, 353; 137/98, 563; 222/318, 146.1, 146.2, 146.6, 146.5

[56] References Cited

U.S. PATENT DOCUMENTS

| 4,682,712 | 7/1987 | Bohnensieker | 137/98 X |
| 4,895,192 | 1/1990 | Mortenson | 141/5 |
| 4,895,219 | 1/1990 | Welch et al. | |
| 4,909,354 | 3/1990 | Fluegel | |
| 4,926,914 | 5/1990 | Morizumi et al. | 141/59 |

FOREIGN PATENT DOCUMENTS

| 524041 | 7/1940 | United Kingdom | 137/98 |
| 525541 | 8/1940 | United Kingdom | 137/98 |

Primary Examiner—Ernest G. Cusick
Attorney, Agent, or Firm—R. P. Lenart

[57] ABSTRACT

A liquid cooled electric generating apparatus is provided with a liquid circulation system that is divided into two portions. One of the portions includes a rotor mounted in a rotor cavity such that rotation of the rotor expels liquid from that portion of the circulation system. A normally open valve connects the two portions of the liquid circulation system. This valve is automatically closed during filling of the portion of the liquid circulation system which does not contain the rotor cavity. Both the liquid circulation system of the generating apparatus and the method of filling the system are encompassed by this invention.

8 Claims, 4 Drawing Sheets

5,139,055

LIQUID COOLED ELECTRIC GENERATING APPARATUS AND METHOD FOR FILLING A LIQUID CIRCULATION SYSTEM THEREIN

This application is a continuation of application Ser. No. 07/605,895 filed Oct. 30, 1990, now abandoned.

BACKGROUND OF THE INVENTION

This invention relates to liquid cooled electric generating apparatus and more particularly, to the liquid circulation system therein and methods for filling that liquid circulation system.

Liquid cooled electric generating apparatus such as that used in aircraft electric power systems, may include an oil cooled generator or a generator-converter integrated package. A liquid circulation system used in such apparatus typically includes a primary reservoir for containing coolant oil and a pump driven by the generator rotor which circulates the coolant oil through numerous passages in the generator stator and an associated heat exchanger. Coolant oil is also delivered to a generator rotor and associated bearings.

When the apparatus is installed on an aircraft engine or a drive pad, it must be charged with coolant oil to a proper level. If the oil is introduced directly into the reservoir, the oil passages around the stator, all oil lines leading to and from the heat exchanger, and the heat exchanger internal passages will not be filled with oil. These lines and passages will be filled when the generator's pump is operated, but this will lower the level in the reservoir and require a second filling. Alternatively, if oil is introduced into the stator passageway, thereby filling the stator, heat exchanger, reservoir and associated passages, oil will also fill the rotor cavity. When the generator is spun, the spinning rotor will clear the rotor cavity, thereby increasing the amount of oil in the reservoir and requiring that the reservoir be drained to achieve the proper oil level.

Both oil filling scenarios described above are undesirable and time consuming. This invention seeks to overcome the deficiencies in the above filling scenarios such that the proper coolant level can be achieved in a single filling operation.

SUMMARY OF THE INVENTION

This invention provides a liquid cooled electric generating apparatus having a liquid circulation system divided into first and second portions wherein the first portion includes a means for expelling liquid. A normally open valve is connected between the first and second portions of the liquid circulation system. During the filling of the second portion of the liquid circulation system, the valve is automatically closed to prevent filling of the first portion of the system.

This invention permits the filling of passages in a stator, heat exchanger, reservoir and associated connecting lines, while preventing the filling of a rotor cavity in a typical liquid cooled electric generating apparatus. When the filling operation is complete, the valve returns to its normally open condition and operation of the internal coolant pump circulates coolant liquid throughout the apparatus.

This invention encompasses both liquid cooled electric generating apparatus having a liquid circulation system with two portions separated by a normally open valve and the method used to fill the liquid circulation system of such apparatus.

BRIEF DESCRIPTION OF THE DRAWINGS

This invention will become more readily apparent from the following description of the preferred embodiments thereof, as illustrated in the accompanying drawings wherein.

DESCRIPTION OF THE PREFERRED EMBODIMENTS

Figure 1:
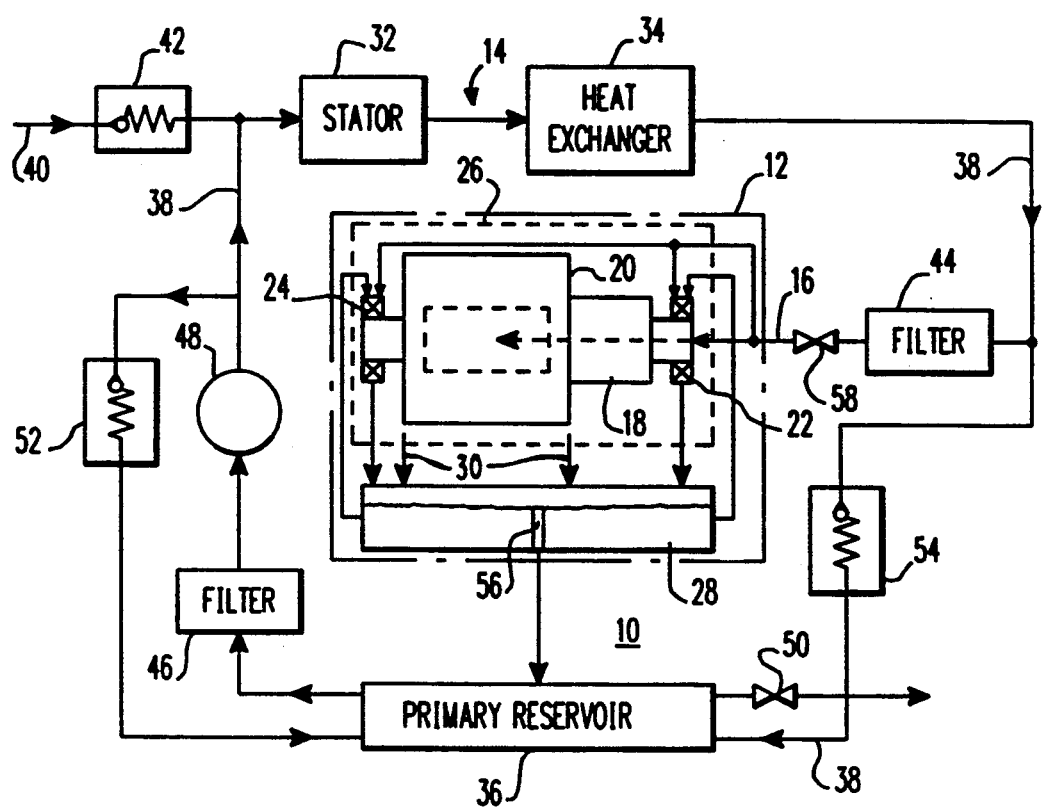
FIG. 1 is a block diagram of a liquid cooled electric generating apparatus constructed in accordance with the present invention.

Referring to the drawings, FIG. 1 is a schematic diagram of a liquid cooled electric generating including a liquid circulation apparatus system 10 having a first portion 12 and a second portion 14. The first portion includes a plurality of coolant passages 16 which deliver liquid coolant axially into a hollow shaft 18 of a rotor 20 and to rotor bearings 22 and 24 used to support the shaft. The rotor is rotatably mounted in a cavity 26 such that rotation of the rotor expels excess oil in the cavity. A secondary reservoir 28 receives coolant oil which drains from the rotor and associated end bearings as illustrated by arrows 30.

The second portion 14 of the liquid circulation system includes a plurality of coolant passages in a stator 32, a heat exchanger 34, a primary reservoir 36, and various connecting lines generally labeled 38.

A pressure fill inlet line 40 is connected to the second portion of the liquid circulation system through a check valve 42. Filters 44 and 46 are positioned within the oil circulating lines. A pump 48 which is coupled to the rotor, is used to circulate coolant oil through the liquid circulation system. An over fill valve 50 is provided to permit the escape of excessive coolant oil during a filling operation. A high pressure bypass valve 52 diverts coolant to the primary reservoir in the event of excessive pressure in line 38. A low pressure bypass valve 54 diverts coolant to the primary reservoir if coolant flow into the first portion 12 of the liquid circulation system is obstructed. Coolant oil in the secondary reservoir passes to the primary reservoir when the level of oil in the secondary reservoir reaches a preset height as illustrated schematically by the standpipe 56.

Figure 2:
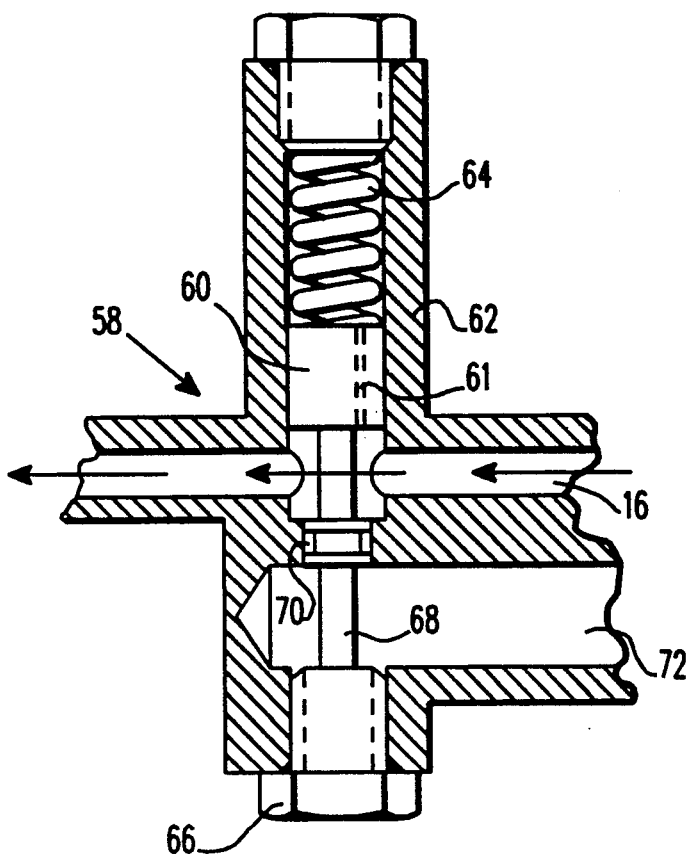
FIGS. 2 and 3 are cross sectional views of a normally open valve used in the system of FIG. 1.
Figure 3:
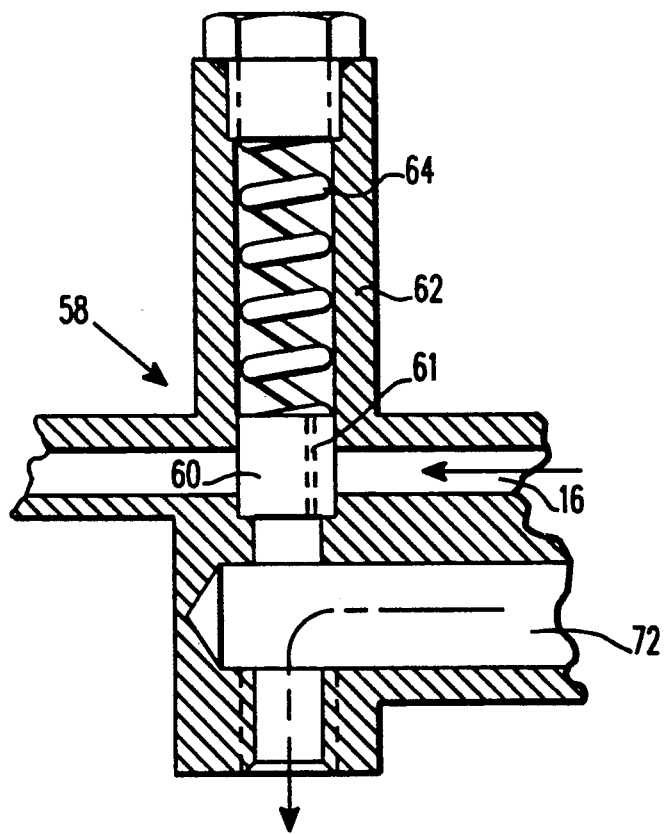

All the items discussed with respect to FIG. 1 up to this point are found in existing liquid cooled electric generating apparatus. This invention adds a normally opened rotor oil supply valve 58 which is automatically closed during a filling operation to prevent the filling of the rotor cavity. FIG. 2 is a cross section of one embodiment of a rotor oil supply valve 58 which may be used in the system of FIG. 1. When inserted into that system, one of the coolant passages 16 passes through the valve. A piston 60 is slidably mounted in the valve housing 62 and is subject to a force provided by a biasing spring 64. This force tends to force the piston into a position which blocks passage 16. However, the piston is held in the position shown by an overflow/vent plug 66 which includes an extension 68 that bears against one end of piston 60. An oil seal 70 is positioned on this overflow/vent plug extension to prevent coolant oil from escaping from passage 16. A second coolant flow passage 72 is provided for connection to the primary reservoir or a duct to that reservoir. FIG. 3 is a cross section of the rotor oil supply valve of FIG. 2 wherein the overflow-/vent plug has been removed. In this case, piston 60 has been forced downward by spring 64 such that the piston blocks passage 16. As shown in FIG. 2, coolant oil for delivery to the rotor and bearings is normally allowed to flow freely around the small diameter of the overflow/vent plug extension. When the plug is removed, as shown in FIG. 3, the piston moves via the spring force into a position that causes blockage of the rotor and bearing oil supply. It is normal procedure for the overflow/vent plug to be removed during an oil filling operation. Typically, the plug is physically locked to a cap on a fill valve so that the plug has to be removed before oil can be inserted into the fill valve. After the primary reservoir has been filled to its proper level, the overflow/vent plug is replaced, thus causing the piston 60 to be returned to its open position as depicted in FIG. 2. A bleed hole 61 through the piston aids in equalizing pressure on opposite sides of the piston, thereby facilitating movement.

Figure 4:
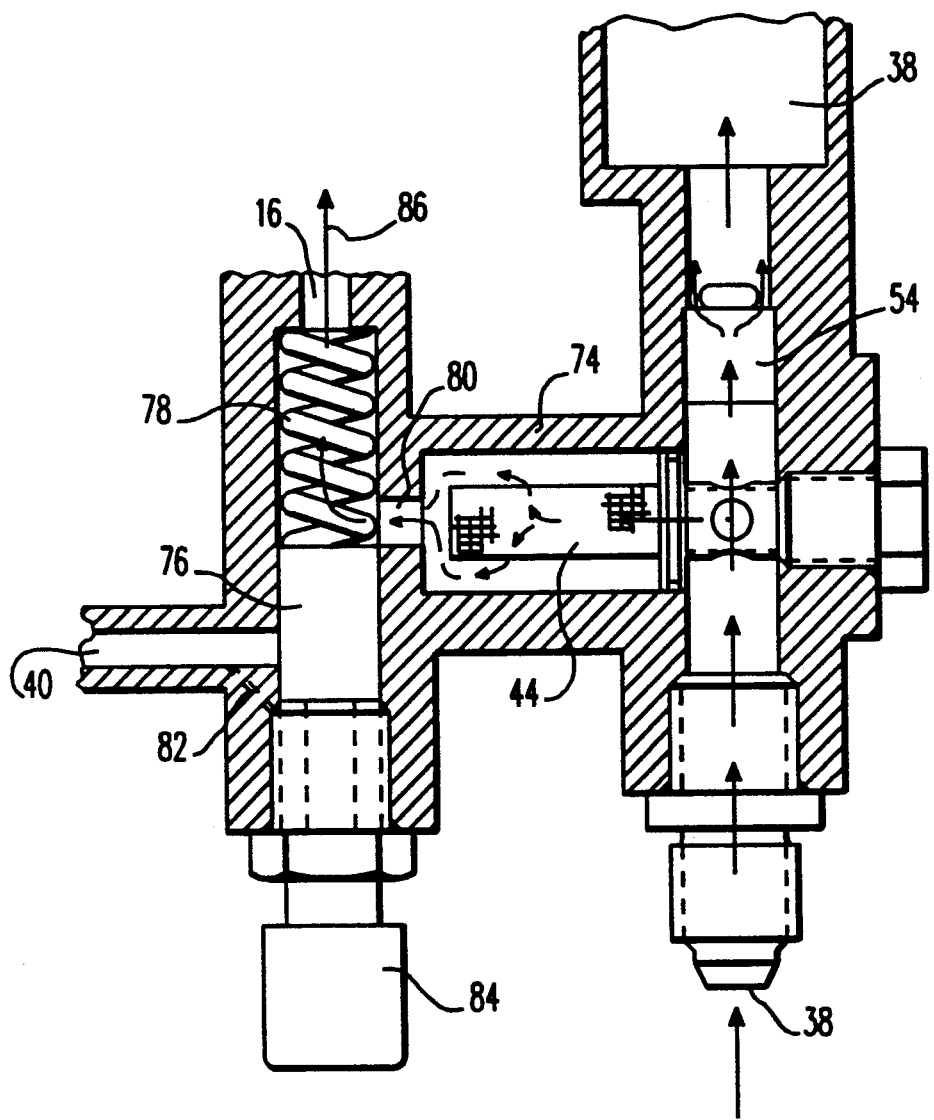
FIGS. 4 and 5 are cross sections of an alternative embodiment of a valve for use in the system of FIG. 1.
Figure 5:
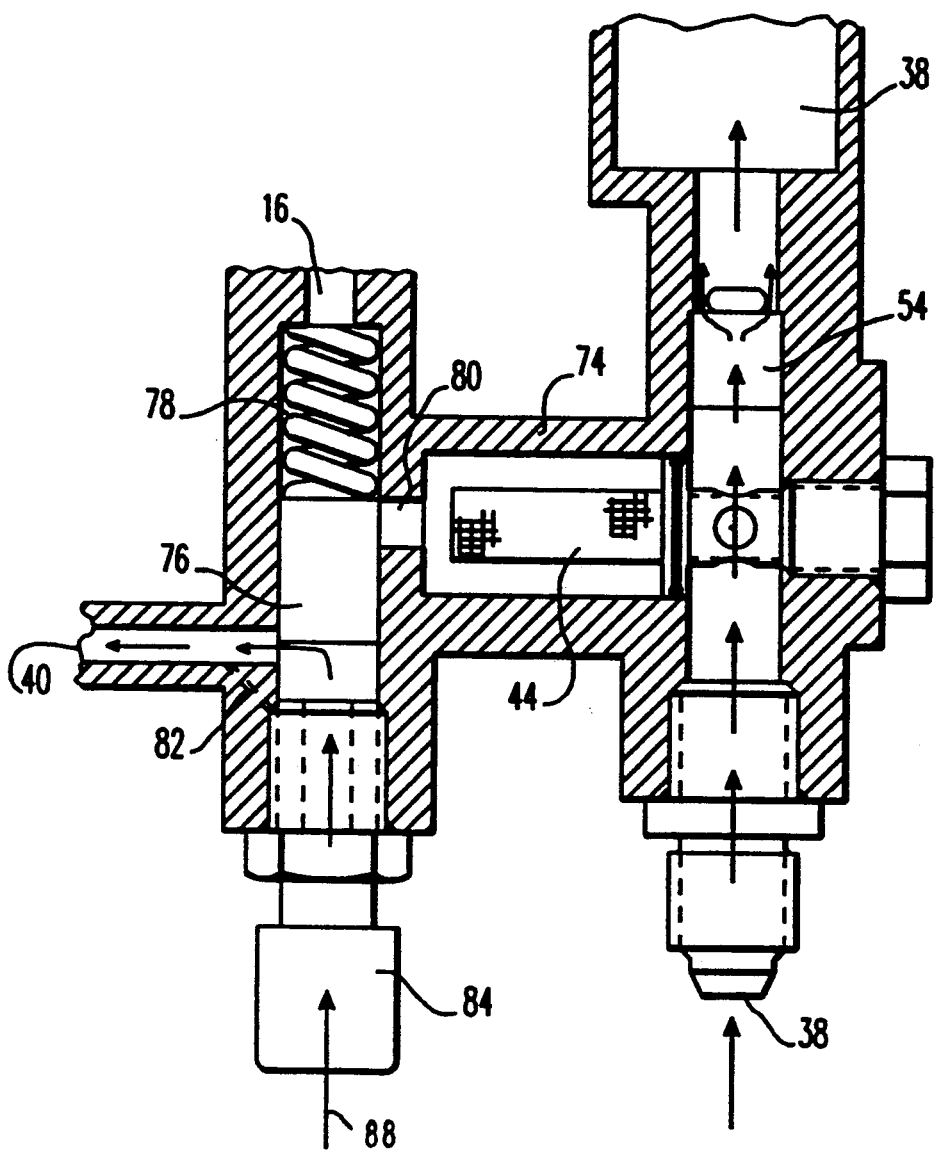

FIGS. 4 and 5 are cross sectional views of an alternative rotor oil supply valve for use in the system of FIG. 1. The valve body 74 of this valve houses the filter 44 and low pressure bypass valve 54 shown in FIG. 1. A piston 76 is slidably mounted in the valve body and subject to a force produced by spring 78 so that it is normally in the position shown in FIG. 4 wherein it does not block opening 80 and coolant oil is free to flow to the rotor and bearings through passage 16 as illustrated by arrow 86. An oil fill adaptor 84 is connected to the valve housing such that when pressurized oil is injected through the adaptor as illustrated by arrow 88 in FIG. 5, this pressurized oil pushes against one end of piston 76 thereby compressing spring 78 and moving the piston such that it blocks opening 80. The piston 76 has a sufficient length such that opening 80 is closed before oil passage 40 opens, thereby ensuring that coolant oil does not enter the rotor cavity during the filling operation. A bleed hole 82 in valve body 74 allows the piston to return to its original position.

The pressure displaced rotor supply valve of FIGS. 4 and 5 will operate without any action of the servicing technician other than introducing oil through the oil fill adaptor. The valve will position itself properly even when the servicing technician fails to remove or open the reservoir overflow/vent valve as required during a typical oil fill procedure.

The rotor oil supply valves illustrated in FIGS. 2-5 are normally open and automatically assume the proper position in which coolant oil to the rotor cavity is blocked, as a result of normal procedures during an oil filling operation. These valves require no special action by the technician who is servicing the generator or the generator-converter integrated package. The volume of the secondary reservoir is small when compared with that of the rest of the coolant system. Therefore, during initial filling of the system, the secondary reservoir can be left empty without causing a significant drop in the coolant level after the pump has operated.

Although the present invention has been described in terms of its preferred embodiments, it will be apparent to those skilled in the art that various changes may be made without departing from the scope of the invention. It is therefore intended that the appended claims cover such changes.

What is claimed is:

1. A liquid cooled apparatus, said apparatus comprising:

a liquid circulation system having first and second portions, said first portion including a rotor cavity and a rotor rotationally mounted within said rotor cavity;
   a valve connecting said first and second portions of said liquid circulation system, said valve being normally open; and
   means for automatically closing said valve during filling of said second portion of said liquid circulation system.

2. A liquid cooled apparatus as recited in claim 1, wherein said valve includes:
   a valve body;
   a first liquid passage in said valve body, said first liquid passage being connected to said first portion of said liquid circulation system;
   a piston slidably mounted in said valve body;
   means for biasing said piston toward a first position in which said piston does not block said first liquid passage; and
   means for moving said piston to a second position in which said piston blocks said first liquid passage when a filling operation is performed.

3. A liquid cooled apparatus as recited in claim 2, wherein:
   said means for biasing said piston toward a first position includes an overflow vent plug which is removed during filling of said second portion of said liquid circulation system; and
   said means for moving said piston to a second position includes a spring.

4. A liquid cooled apparatus as recited in claim 1, wherein said valve includes:
   a valve body;
   a first liquid passage in said valve body, said first liquid passage being connected to said first portion of said liquid circulation system;
   a second liquid passage in said valve body, said second liquid passage being connected to said first liquid passage and being connected in said second portion of said liquid circulation system;
   a piston slidably mounted in said valve body;
   means for biasing said piston toward a first position in which said piston does not block said first liquid passage; and
   means for moving said piston to a second position in which said piston blocks said first liquid passage when a filling operation is performed.

5. A liquid cooled apparatus as recited in claim 4, wherein:
   said means for biasing said piston toward a first position includes a spring; and
   said means for moving said piston to a second position includes an opening for receiving liquid under pressure, wherein one end of said piston extends into said opening.

6. A method for filling a liquid circulation system of a liquid cooled apparatus, said method comprising the steps of:
   partitioning the liquid circulation system into first and second portions, said first portion including a rotor within a rotor cavity;
   connecting a normally open valve between said first and second portions of the liquid circulation system;
   filling said second portion of the liquid circulation system with a liquid; and automatically closing said valve during the step of filling said second portion of the liquid circulation system.

7. The method of claim 6, wherein said step of automatically closing said valve comprises the step of: removing an overflow valve plug.

8. The method of claim 6, wherein said step of automatically closing said valve comprises the step of:
injecting pressurized liquid into said valve, thereby moving a piston slidably mounted in said valve to block a passage in said first portion of said liquid circulation system.

* * * * *